No. 636,683.

O. J. MOUSSETTE.
ACETYLENE GAS GENERATOR.
(Application filed Oct. 13, 1898.)

Patented Nov. 7, 1899.

(No Model.)

3 Sheets—Sheet 1.

WITNESSES:
E. Wolff
Chas. E. Poensgen

INVENTOR:
Oliver J. Moussette.
BY
Hauff & Hauff
ATTORNEYS.

No. 636,683.  
O. J. MOUSSETTE.  
ACETYLENE GAS GENERATOR.  
(Application filed Oct. 13, 1898.)  
Patented Nov. 7, 1899.

(No Model.)

3 Sheets—Sheet 2.

WITNESSES:
E. Wolff
Chas. E. Poenagen

INVENTOR
Oliver J. Moussette,
BY
Hauff & Hauff
ATTORNEYS

No. 636,683. Patented Nov. 7, 1899.
O. J. MOUSSETTE.
ACETYLENE GAS GENERATOR.
(Application filed Oct. 13, 1898.)
(No Model.) 3 Sheets—Sheet 3.
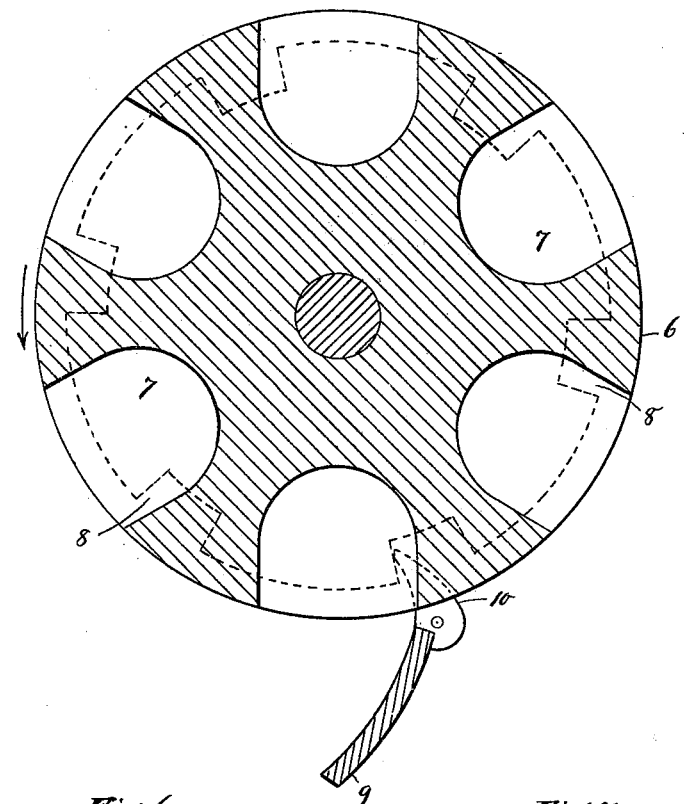
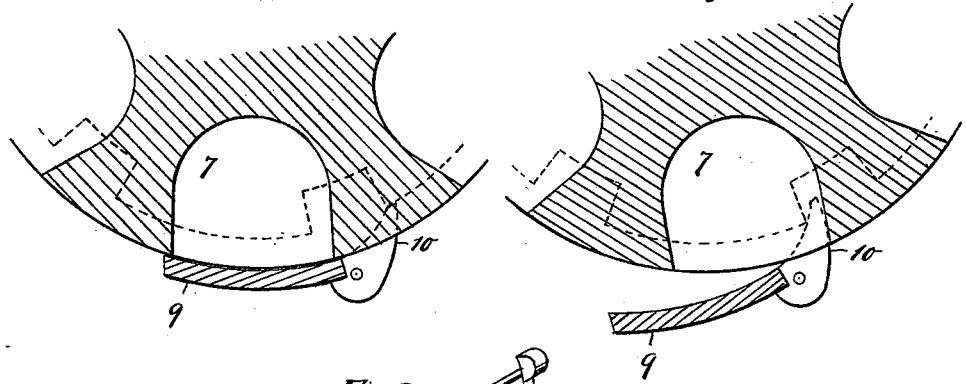
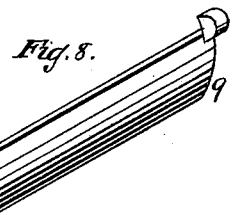
WITNESSES:
E. Wolff
Chas. E. Poensgen
INVENTOR:
Oliver J. Moussette.
BY
Hauff & Hauff
ATTORNEYS.

UNITED STATES PATENT OFFICE.

OLIVER J. MOUSSETTE, OF NEW YORK, N. Y.

ACETYLENE-GAS GENERATOR.

SPECIFICATION forming part of Letters Patent No. 636,683, dated November 7, 1899.

Application filed October 13, 1898. Serial No. 693,438. (No model.)

*To all whom it may concern:*

Be it known that I, OLIVER J. MOUSSETTE, a citizen of the United States, residing at New York, (Rockaway Beach,) Queens county, State of New York, have invented new and useful Improvements in Acetylene-Gas Generators, of which the following is a specification.

This invention relates to a gas-generator by which the use of calcium-carbid tablets or receptacles can be dispensed with and which is automatic in its operation, as set forth in the following specification and claims and illustrated in the annexed drawings, in which—

Figure 1:
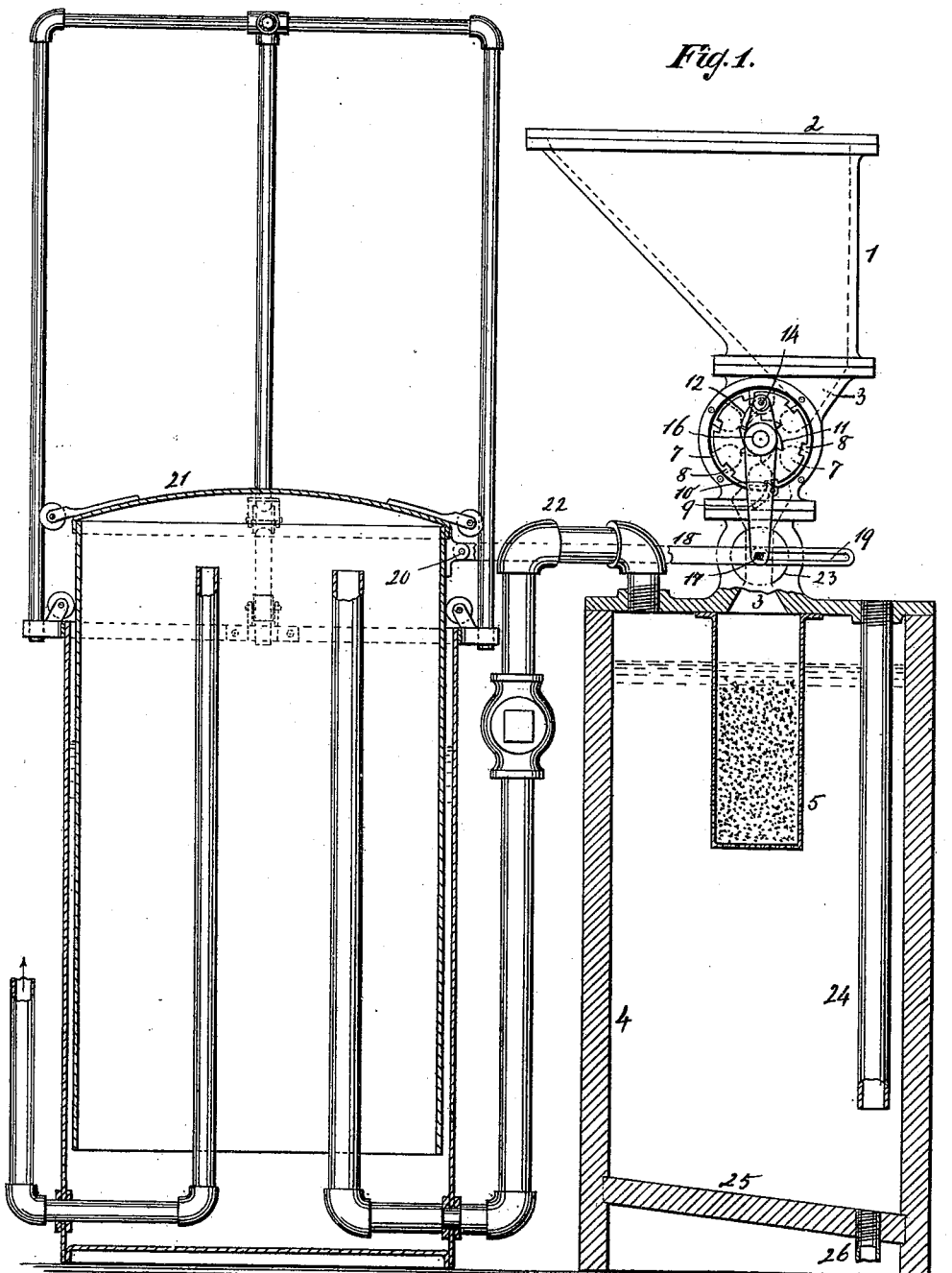
Figure 2:
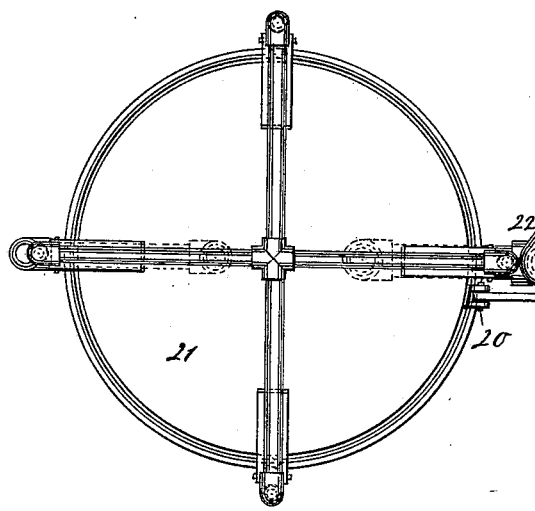
Figure 4:
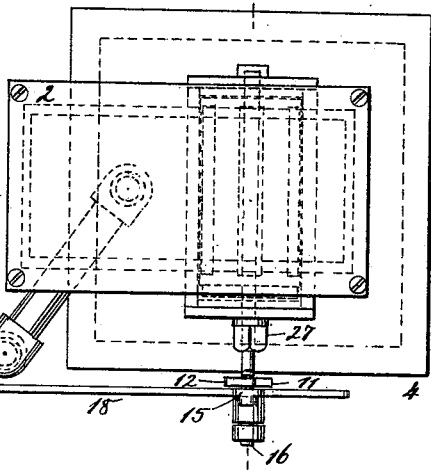
Figure 4:
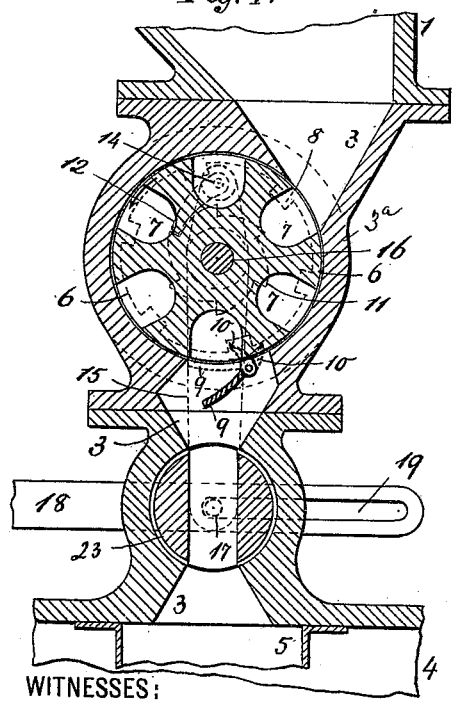
Figure 3:
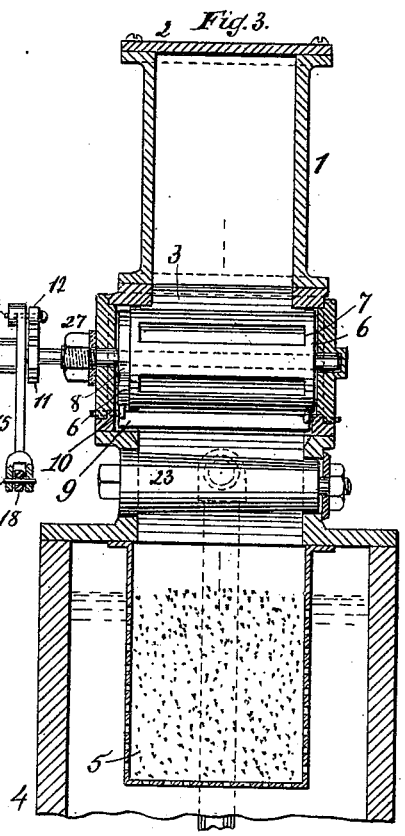

Figure 1 is a sectional elevation of the generator. Fig. 2 is a plan view of Fig. 1. Fig. 3 is a detail sectional view of a hopper and carrier. Fig. 4 is a sectional side elevation of Fig. 3. Fig. 5 is a cross-sectional view of the carrier, showing the trap or door as just having opened or dropped. Fig. 6 is a similar detail view showing the trap as closed, but just about to open. Fig. 7 is a view similar to Fig. 6, showing the trap as partly closed; and Fig. 8 is a detail perspective view of the trap.

In the drawings is shown a hopper 1 for the charge or calcium carbid and which hopper can be closed by a cover 2 to prevent waste or escape while the device is in use. From hopper 1 leads a passage or communication 3 to tank 4, conveniently called "generating-tank," and which is supplied with water or liquid, so that on the entry of carbid into the tank the gas generation commences. The carbid or charge is prevented from dropping to the bottom of the tank by a perforated holder or sieve 5, secured at the upper part of the tank and made to catch the charge coming from the conduit 3.

In the conduit 3, running direct from the hopper to the tank, is placed a carrier 6, Fig. 4, so as to communicate directly with the hopper and tank. The casing in which the conduit 3 is formed is provided with a cylindrical enlargement $3^a$, in which the rotary carrier 6 is mounted, and the interior of said enlargement forms a part of said conduit. The carrier has a series of pockets 7, and as the carrier rotates the hopper or its contents successively fill the pockets. Such carrier also has a ratchet or notches 8, and in the passage 3 is a trap or door 9, with pawl or arm 10. The said trap or door is mounted to rock in suitable bearings in the casing in which the conduit 3 is formed and is located and arranged to control the passage from the interior of the enlargement $3^a$ to the lower end of the conduit 3. It is formed with a broad body part, adapted when in its raised position to form a continuation of the lower part of the enlargement $3^a$, and has the pawl or arm 10 formed upon or screwed to one end thereof. The arrangement is such that when a pocket 7 has emptied itself onto trap 9 a notch 8 is brought opposite to pawl 10 to free the latter and allow trap 9 to drop or open, so that the entire charge from a pocket 7 can pass or drop at once into tank 4 or holder 5. As the carrier is further rotated the respective notch 8 is carried away from the pawl 10, so that the latter is forced to again raise or close trap 9.

The rotation of the carrier 6 is effected by ratchet 11, engaged by pawl 12, mounted at 14 on arm 15, made to swing on the shaft 16 of carrier 6. The arm 15 has a pin 17, and a link 18 has a slot part 19, which, with pin 17, forms a sliding or slot connection between link 18 and arm 15.

The arm 18 is jointed or connected at 20 to the holder or gasometer 21, which, as shown, rises and falls as it fills and empties. The gas generated in tank 4 and passing through conduit 22 into holder 21 will cause the latter to rise. The alternate rise and fall of the gasometer will reciprocate link 18 and pawl 12, so as to rotate the carrier 6 and cause one pocket 7 after the other to discharge onto trap 9, which then delivers the charge to the generator, as noted. The slot 19 is so arranged or of such size that while the link 18 follows the rise and fall of the gasometer the pin-and-slot connection 17 and 19 prevents the pawl 12 being moved by more than one tooth of ratchet 11 on the rise of meter 21. The drop of meter 21 is thus accompanied by the partial rotation of the carrier 6 to the extent of one pocket 7 or of one tooth of ratchet 11.

The passage 3 is provided with a stop-cock 23, which can be closed to prevent waste or escape from tank 4 while the cover 2 is removed, as during the filling of hopper 1. Excessive pressure in tank 4 can be prevented by a safety or escape pipe 24, Fig. 1, which dips below the water-line in the tank, so that no gas can pass off through such pipe 24. In the event of too great pressure of gas in the generating-tank the water contained therein will be forced out through the pipe 24. The holder or sieve 5 being at the upper part of the tank or above the lower mouth of pipe 24, the gas generated passes from the holder to the upper part of the tank, so as not to escape through such pipe 24. The bottom 25 of tank 4 being suitably inclined and provided with discharge or cleaning opening or pipe 26, any sediment or other matter can be drawn off or the tank 4 cleaned, as required. The shaft 16 of carrier 6 is shown with a nut 27, Fig. 3, by which packing can be forced to the hopper to form a stuffing-box.

What I claim as new, and desire to secure by Letters Patent, is—

1. A hopper and a generating-tank, combined with a carrier made to communicate with the hopper, and a door for controlling the passage from the carrier to the generating-tank, the said door being mounted independently of the carrier, but actuated thereby, and made to receive a charge from the carrier and to deliver it to the tank, substantially as described.

2. A hopper and a generating-tank, combined with a rotary carrier mounted in the passage between the hopper and the tank, a toothed wheel connected to said carrier, a pivotally-mounted trap or door for controlling the passage between said carrier and tank, and a tooth or pawl carried by said trap and adapted to be engaged by said toothed wheel, whereby said trap will be automatically opened and closed, substantially as described.

3. A hopper and a generating-tank, combined with a carrier made to communicate with the hopper, and a door provided with a pawl, said carrier having a ratchet for engaging the pawl to open and close the door substantially as described.

4. A hopper and a generating-tank, combined with a carrier, a ratchet-wheel connected thereto, a lever loose on the carrier-shaft, a pawl carried by the lever for engaging said ratchet-wheel, a holder, and a link connected to the holder and to the lever for rocking the latter, said link having a connection with said lever which provides for a small degree of lost motion, substantially as described.

In testimony whereof I have hereunto set my hand in the presence of two subscribing witnesses.

OLIVER J. MOUSSETTE.

Witnesses:
W. C. HAUFF,
E. F. KASTENHUBER.